(12) United States Patent
Jutamulia

(10) Patent No.: US 6,768,593 B1
(45) Date of Patent: Jul. 27, 2004

(54) FIBER-COUPLED LASER DIODE HAVING HIGH COUPLING-EFFICIENCY AND LOW FEEDBACK-NOISE

(76) Inventor: Suganda Jutamulia, 2108 Jefferson Ave., Berkeley, CA (US) 94703

( * ) Notice: Subject to any disclaimer, the term of this patent is extended or adjusted under 35 U.S.C. 154(b) by 0 days.

(21) Appl. No.: 10/602,450

(22) Filed: Jun. 24, 2003

(51) Int. Cl.[7] ............................................. G02B 27/30
(52) U.S. Cl. ...................... 359/641; 359/710; 385/15; 385/33
(58) Field of Search ................................ 359/641, 216, 359/372, 710, 711; 385/15, 31–33, 52

(56) References Cited

U.S. PATENT DOCUMENTS

| | | | |
|---|---|---|---|
| 4,915,484 A | | 4/1990 | Yamamoto ................... 350/420 |
| 5,125,052 A | * | 6/1992 | Lehureau et al. .............. 385/33 |
| 5,181,224 A | | 1/1993 | Snyder ........................ 372/101 |
| 5,553,174 A | | 9/1996 | Snyder .......................... 385/15 |
| 6,075,650 A | | 6/2000 | Morris et al. ................ 359/641 |
| 2002/0114082 A1 | * | 8/2002 | Davydenko ................. 359/641 |
| 2003/0039276 A1 | * | 2/2003 | Tatsuno et al. ............... 372/31 |
| 2003/0058904 A1 | * | 3/2003 | Krainer et al. ................ 372/25 |
| 2004/0051956 A1 | * | 3/2004 | Suzuki ........................ 359/641 |

OTHER PUBLICATIONS

M. Saruwatari and K. Nawata, "Semiconductor laser to single–mode fiber coupler," Applied Optics, vol. 18, 1847–1856 (1979).
M. Cote an R. R. Shannon, "optimization of waveguide coupling lenses with optical design software," Applied Optics, vol. 35, 6179–6185 (1996).
J. J. Snyder, "Cylindrical micro–optics," Proceedings of SPIE, vol. 1992, 235–246 (1993).
S. Jutamulia, "Correction of laser diode beam using microlens optics," Optical Memory and Neural Networks, vol. 10, 113–116 (2001).
W. Bludau and R. H. Rossberg, "Low–loss laser–to–fiber coupling with negligible optical feedback," Journal of Lightwave Technology, vol.LT–3, 294–302 (1985).
S. Jutamulia, "Optical communications: technology and economy," Proceedings of the 2002 International Conference on Opto–Electronics and Laser Applications, A–07–A–10 (2002) ISBN:979–8575–03–2.

* cited by examiner

Primary Examiner—Huy Mai

(57) ABSTRACT

A laser diode (20) emits astigmatic and elliptical light. The long axis of ellipse is the fast axis of light, and the short axis of ellipse is the slow axis of light. A collimating lens (34) first collimates the slow-axis light. Following the collimating lens (34), a first cylindrical lens (36) focuses the un-collimated fast-axis light. The focused fast-axis light then diverges and reaches a second cylindrical lens (38). The second cylindrical lens (38) collimates the fast-axis light. The collimated slow-axis light is unaffected by both cylindrical lenses. The beam-waist of the fast-axis light is substantially equal to the beam-waist of the slow-axis light by properly designing the focal lengths of both cylindrical lenses. The second cylindrical lens (38) outputs an astigmatic-aberration-free, circular collimated-beam. The corrected beam is then input to a low-feedback-noise fiber collimator (28), resulting in a fiber-coupled laser diode having both high coupling-efficiency and low feedback-noise.

14 Claims, 3 Drawing Sheets

FIBER-COUPLED LASER DIODE HAVING HIGH COUPLING-EFFICIENCY AND LOW FEEDBACK-NOISE

CROSS-REFERENCE TO RELATED APPLICATION

Not applicable.

BACKGROUND

1. Field of Invention

This invention relates to fiber-coupled laser diodes, specifically to fiber-coupled laser diodes that have both high coupling-efficiency and low feedback-noise.

2. Description of Prior Art

A fiber-coupled laser diode uses a fiber to transmit the laser diode light. Since the light emitted from the laser diode has already been launched into a fiber, a fiber-coupled laser diode can be readily used in optical-fiber networks for communications and sensing. In addition, a fiber-coupled laser diode is a flexible coherent light source, which can also be used in many optical devices, such as biomedical equipment, optical disk systems, laser printers, and others. A good fiber-coupled laser diode must provide both high coupling-efficiency to maximize the optical power output from the fiber and low feedback-noise to eliminate frequency and intensity fluctuations in the output light.

Coupling Efficiency

In order to obtain high coupling-efficiency between a laser diode and a single-mode fiber, i.e., to maximize the transmitted optical power through the fiber, the laser diode light distribution must match the node of the fiber. (See for example, M. Saruwatari and K. Nawata, "semiconductor laser to single-mode fiber coupler," Applied Optics, Vol. 18, 1847–1856 (1979); M. Cote and R. R. Shannon, "Optimization of waveguide coupling lenses with optical design software," Applied Optics, Vol. 35, 6179–6185 (1996)) The mode of a single-mode fiber has a circular Gaussian distribution. If the light distribution does not match the mode of the fiber, only part of the light enters and propagates through the fiber. Consequently, the output optical power from the fiber is low. On the other hand, if the light distribution matches the mode of fiber, the entire light will enter and propagate through the fiber. Thus, the coupling efficiency is nearly 100%. In other words, almost all optical power emitted from the laser diode is transmitted through the fiber.

The light emitted from a laser diode has an elliptical Gaussian distribution and astigmatic aberration. Thus, the emitted light must be corrected to a circular Gaussian beam, which must also be free from astigmatic aberration. A method for correcting the laser diode light using a microlens is described in J. J. Snyder, "Cylindrical micro-optics," Proceedings of SPIE, Vol. 1992, 235–246 (1993); S. Jutamulia, "Correction of laser diode beam using microlens optics," Optical Memory and Neural Networks, Vol. 10, 113–116 (2001); and U.S. Pat. No. 5,181,224 to Snyder (1993).

After the laser diode light is corrected to be free from astigmatic aberration, and to have a circular Gaussian distribution, the laser diode light is focused using an imaging lens onto the entrance end of the single-mode fiber. The beam-waist of the corrected Gaussian beam can be varied to match the mode of fiber by adjusting the distance from the microlens to the imaging lens, and the distance from the imaging lens to the fiber.

A prior-art fiber-coupled laser diode using a microlens is schematically shown in FIG. 1. The astigmatic and elliptical beam emitted by a laser diode 20 is corrected by a microlens 22 to an astigmatic-aberration-free, circular Gaussian beam. The corrected beam is then focused by an imaging lens 24 to enter a single-mode fiber 26.

Although high coupling-efficiency can be expected since the light distribution matches the mode of fiber, it has a severe drawback, i.e., high feedback-noise, as will be discussed in the following section. The feedback noise will generate frequency and intensity fluctuations in the output light. Thus, it will seriously limit the usefulness of the fiber-coupled laser diode.

Feedback Noise

A laser diode is a light-emitting device based on a light amplification effect. Light is amplified when it passes inside a laser diode. Similar to other lasers, a laser diode has a resonator. The resonator has a frequency response, while the light amplification effect has another frequency response. The overlapping area of two frequency responses will determine the lasing frequency (i.e., the frequency of the laser light). If no light from outside the resonator enters the laser diode, the light emitted by the laser diode will have a stable intensity and frequency. However, if light from outside the resonator enters the laser diode, the outside light will also be amplified and interfere with the light generated inside the resonator, resulting in frequency and intensity fluctuations in the emitted light. The outside light includes the light emitted from the laser diode and then reflected back into the laser diode. The reflection of a fraction larger than $10^{-6}$ of the emitted optical power is sufficient to generate the intensity and frequency fluctuations. (W. Bludau and R. H. Rossberg, "Low-loss laser-to-fiber coupling with negligible optical feedback," Journal of Lightwave Technology, Vol. LT-3, 294–302 (1985))

The prior-art fiber-coupled laser diode shown in FIG. 1 suffers from severe intensity and frequency fluctuations caused by two feedback-noise sources: (1) reflection from microlens 22, because it is very close (about 30 $\mu$M) to laser diode 20, and (2) reflection from the end of fiber 26, because the light reflected from the end of fiber 26 is focused back by lens 24 and microlens 22 to laser diode 20.

Antireflection (AR) coatings reduce the reflection to only about $10^{-3}$ of the incoming power which is not sufficient to suppress the feedback-noise. To reduce the reflection from the end of fiber 26 to enter the laser diode, an angled fiber can be used (i.e., the end of fiber is polished to form an angle that is not perpendicular to the fiber axis). However, this will substantially reduce the coupling-efficiency, since the incoming light will be bent at the entrance end of angled fiber when it enters the angled fiber. The mode matching condition is no longer preserved when the incoming light is bent. The reflection from microlens 22 alone, which is AR coated, is sufficient to generate intensity and frequency fluctuations These unwanted fluctuations limit the application of the apparatus. For example, the intensity fluctuation precludes its use in optical disk systems and the frequency fluctuation precludes its use in laser diode pumped solid-state lasers.

An attempt to make a fiber-coupled laser diode having both high coupling efficiency and low feedback-noise has been made using a microlens, which is directly fused to the fiber. (W. Bludau and R. H. Rossberg, "Low-loss laser-to-fiber coupling with negligible optical feedback," Journal of Lightwave Technology, Vol. LT-3, 294–302 (1985))

Although the feedback-noise can be suppressed to $10^{-7}$ of the emitted light power by placing the microlens exceeding 100 μm away from the laser diode and directly fusing the microlens to the fiber, it fails to obtain high coupling-efficiency. The coupling efficiency is only between 40% and 70%. The fused microlens is fabricated based on an empirical method, instead of precise design and production. Thus, the microlens suffers from severe aberrations, and the coupling efficiency cannot be high. In addition, it cannot be produced in volume.

To summarize, the prior-art fiber-coupled laser diode shown in FIG. 1 is capable of providing a coupling efficiency as high as >90%. (S. Jutamulia, "Optical communications: technology and economy," Proceeding of the 2002 International Conference on Opto-Electronics and Laser Applications, A-07-A-10 (2002) ISBN: 979-8575-03-2) However, it suffers from severe intensity and frequency fluctuations generated by feedback noise. On the other hand, a prior-art fiber-coupled laser diode using a microlens filed to the fiber may suppress feedback noise, but its coupling efficiency is low (<70%).

Objects and Advantages

Accordingly, several objects and advantages of the present invention are:

(1) to provide an improved fiber-coupled laser diode;

(2) to provide a fiber-coupled laser diode with high laser-to-fiber coupling efficiency;

(3) to eliminate intensity and frequency fluctuations in the output light of a fiber-coupled laser diode;

(4) to provide an astigmatic-aberration-free, circular collimated-laser-diode-beam; and (5) to eliminate intensity and frequency fluctuations in the output astigmatic-aberration-free, circular collimated-laser-diode-beam.

Further objects and advantages are to provide a fiber-coupled laser diode, which is simple to use and maintain and which is inexpensive to manufacture in volume. Still further objects and advantages will become apparent from a consideration of the ensuing description and drawings.

SUMMARY

In accordance with the invention, a laser diode is provided with a collimating lens, together with a pair of cylindrical lenses or a cylindrical lens having both positive (convex) surfaces to correct the astigmatic and elliptical laser diode light to an astigmatic-aberration-free, circular collimated-beam. The corrected beam can provide high coupling-efficiency between the laser diode and a single-mode fiber. The beam is then input to a low-feedback-noise fiber collimator, resulting in a fiber-coupled laser diode having high coupling-efficiency and low feedback-noise.

DRAWING FIGURES

REFERENCE NUMERALS IN DRAWINGS

| | |
|---|---|
| 20 laser diode | 22 microlens |
| 24 imaging lens | 26 single-mode fiber |
| 28 low-feedback-noise fiber collimator | 30 angled lens |
| 32 angled fiber | 34 collimating lens |
| 36 first cylindrical lens | 38 second cylindrical lens |
| 40 cylindrical lens | 42 first cylindrical positive surface |
| 44 second cylindrical positive surface | |

Figure 1:
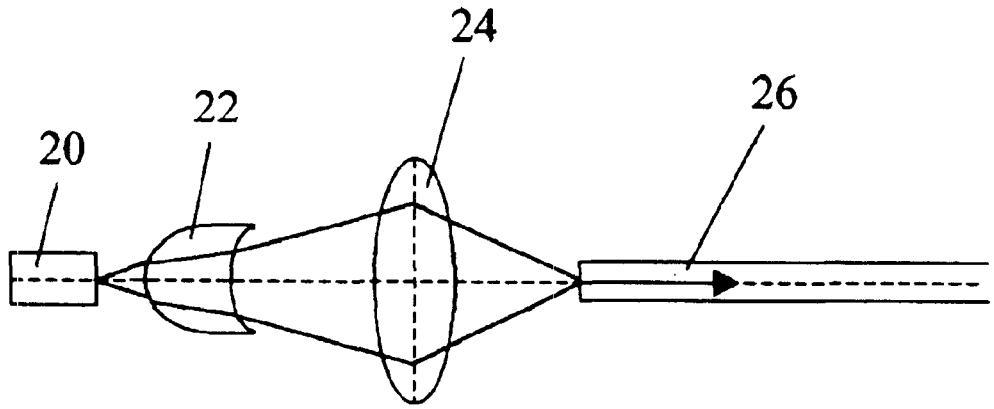
FIG. 1 shows a prior-art fiber-coupled laser diode using a microlens.
Figure 2:
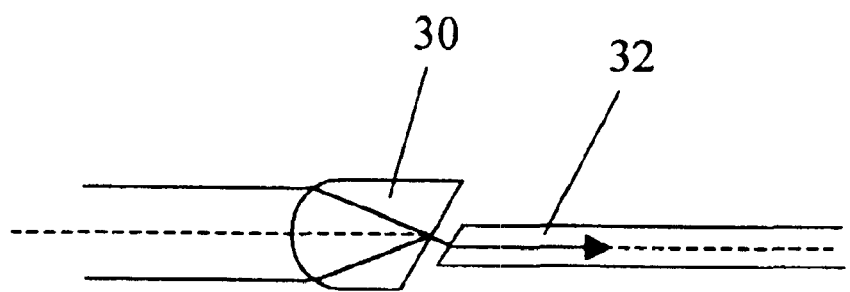
FIG. 2 shows a prior-art low-feedback-noise fiber collimator using an angled fiber.

FIG. 2—Description and Operation

FIG. 2 shows a commercially available low-feedback-noise fiber collimator. An incoming collimated beam is focused by an angled lens 30 onto the entrance end of an angled fiber 32, which is a single-mode fiber. The end of angled fiber 32 is polished to form an angle that is not perpendicular to the fiber axis (it is thus called angled fiber) to prevent the reflected fight from the end of fiber from passing through the same lens 30. Lens 30 is correspondingly polished to form an angle that is not perpendicular to the lens axis, to compensate for the refraction (bending of light) caused by the end of angled fiber 32. This will preserve the mode matching condition and thus keep the maximum coupling-efficiency. There is no loss caused by angled fiber 32, because the refraction caused by angled fiber 32 is compensated for by the refraction caused by angled lens 30. Angled lens 30 can be a glass lens called C-lens or a graded index (GRIN) lens. These types of low-feedback-noise fiber collimators can be purchased from Koncent Communications, Inc., China (www.koncent.com).

Alternatively, the light reflection from the end of a plain (un-angled) fiber can be avoided by fusing lens 30 to fiber 32. In this case, they are simply a plain lens and a plain single-mode fiber. The lens and the fiber are made from the same material. This type of low-feedback-noise fiber collimator can be purchased from LightPath Technologies, Inc., Florida (www.light.net or www.lightpath.com).

If laser light is input to angled fiber 32 from the other end, a circular collimated Gaussian beam will be output from angled lens 30. The beam-waist of this circular collimated Gaussian beam is called the beam-waist of the fiber collimator. A pair of fiber collimators are usually used for outputting the light from and inputting the light back into an optical network.

Figure 3A:
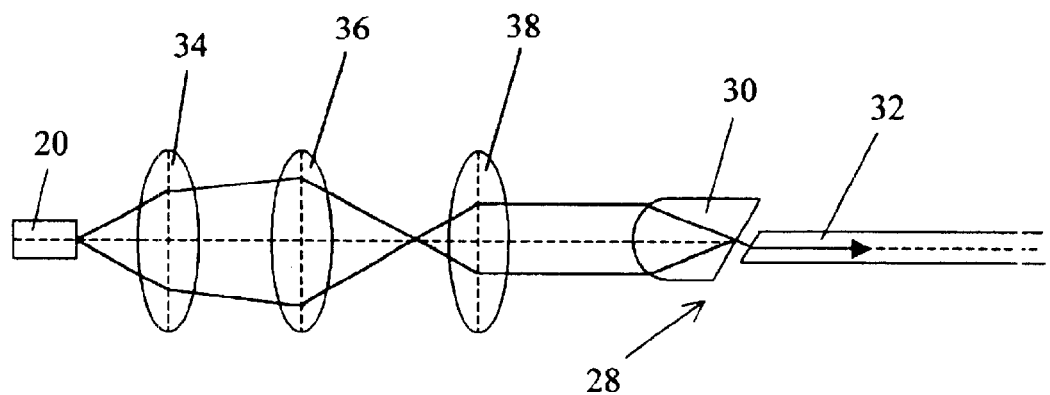
FIG. 3A shows the fiber-coupled laser diode using a pair of cylindrical lenses in accordance with the invention in the fast-axis plane.
Figure 3B:
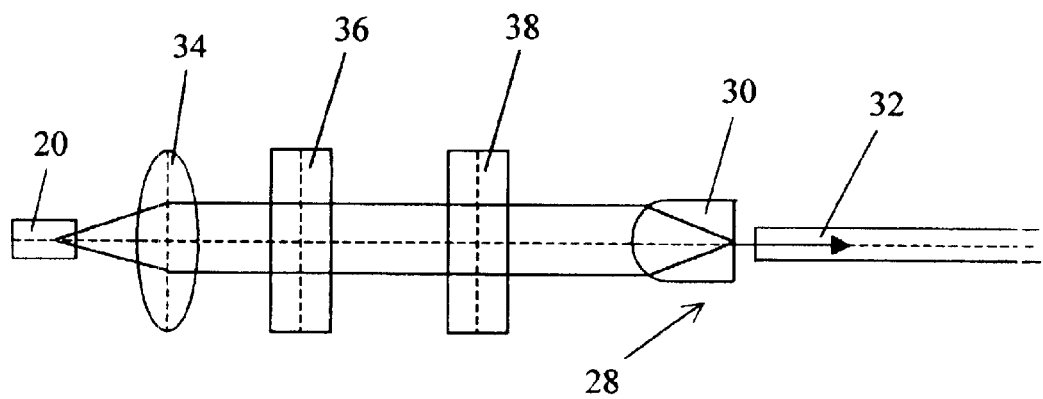
FIG. 3B shows the fiber-coupled laser diode using a pair of cylindrical lenses in accordance with the invention in the slow-axis plane.

FIGS. 3A and 3B—Description and Operation

FIGS. 3A and 3B show a preferred embodiment of a fiber-coupled laser diode using a pair of cylindrical lenses in accordance with the invention. The light emitted by a laser diode is normally elliptical in cross section. For example, laser diodes having 375 to 1550 nm wavelength and 2 to 100 mW power can be purchased from Power Technology, Inc., Arkansas (www.powertechnology.com) and Thorlabs, Inc., New Jersey (www.thorlabs.com). The long axis of the ellipse is known as the fast axis of light, and the short axis of the ellipse is known as the slow axis of light. The fast and slow axes are perpendicular to each other. In addition, because the emitting points in the fast and slow axes are different, the laser diode is astigmatic. The fast-axis light source is at the exit facet of the laser diode (FIG. 3A), while the slow-axis light source is effectively interior to the laser diode (FIG. 3B). The distance between the two sources is called the astigmatism of the laser diode.

FIGS. 3A and 3B show the fast-axis and slow-axis planes, respectively. First, a collimating lens 34 collimates the light emitted from a laser diode 20. The distance between collimating lens 34 and laser diode 20 is larger than 100 $\mu$m. Thus, less than $10^{-7}$ of the emitted light will enter back into laser diode 20 after being reflected by collimating lens 34. The negligible feedback-noise will not generate any intensity and frequency fluctuations in the output light.

Collimating lens 34 perfectly collimates the slow-axis light (FIG. 3B). By using a collimating lens that has the proper focal length, the beam-waist of the slow-axis light can be matched the beam-waist of a low-feedback-noise fiber collimator 28. Since the light source is on the optical axis, an aspheric lens can be used for collimating the diverging light from laser diode 20 without introducing new aberrations. An achromatic lens can also be used instead of an aspheric lens. Although the performance of an achromatic lens is less than that of an aspheric lens, the cost of an achromatic lens is also less than that of an aspheric lens. However, since the light is astigmatic, when the slow-axis light is perfectly collimated by collimating lens 34, the fast-axis light is not correctly collimated (FIG. 3A).

FIG. 3A shows light propagation in the fast-axis plane. A first cylindrical lens 36 focuses the fast-axis light output from collimating lens 34. The focused fast-axis light then diverges and reaches a second cylindrical lens 38. Cylindrical lens 38 has a focal length that perfectly collimates the fast-axis light and produces a new fist-axis beam-waist, which is substantially equal to the slow-axis beam-waist. The proper focal length of second cylindrical lens 38 can be calculated or determined using lens design software, such as Zemax from ZEMAX Development Corp., California (www.zemax.com). The focal length depends on the aspect ratio of the elliptical beam (fast-axis beam-waist divided by slow-axis beam-waist), astigmatism of the beam, and the focal length of first cylindrical lens 36. Thus, an astigmatic-aberration-free, circular collimated-beam is output from second cylindrical lens 38.

To minimize new aberrations introduced by cylindrical lenses 36 and 38, they must be aspheric cylindrical lenses or achromatic cylindrical lenses. Aspheric cylindrical lenses can be biconvex hyperbolic cylindrical lenses or simply plano-hyperbolic cylindrical lenses. On the other hand, an achromatic cylindrical lens has two lens elements having cylindrical-spherical (circular) surfaces, which are easy to grind.

The astigmatic-aberration-free, circular collimated-beam output from second cylindrical lens 38 enters low-feedback-noise fiber collimator 28. Its beam-waist has been matched the beam-waist of fiber collimator 28 by collimating lens 34. Thus, the light emitted from laser diode 20 can fall be input to angled fiber 32 (which is a single-mode fiber) with both high coupling-efficiency and low feedback-noise. Fiber collimator 28 can be a C-lens, a GRIN lens, or a fused lens type fiber collimator, or any new type of low-feedback-noise fiber collimator.

FIG. 3B shows light propagation in the slow-axis plane. Collimating lens 34 collimates the slow-axis light. The slow-axis light is unaffected by both cylindrical lenses 36 and 38, since it is collimated and perpendicular to surfaces of both lenses.

In the fiber-coupled laser diode of FIGS. 3A and 3B, prior to entering into fiber collimator 28, the fast-axis light is flipped 180°, while the slow-axis light is not flipped. However, since the beam has a circular Gaussian distribution, the flipped beam still matches the mode of the fiber.

Figure 4A:
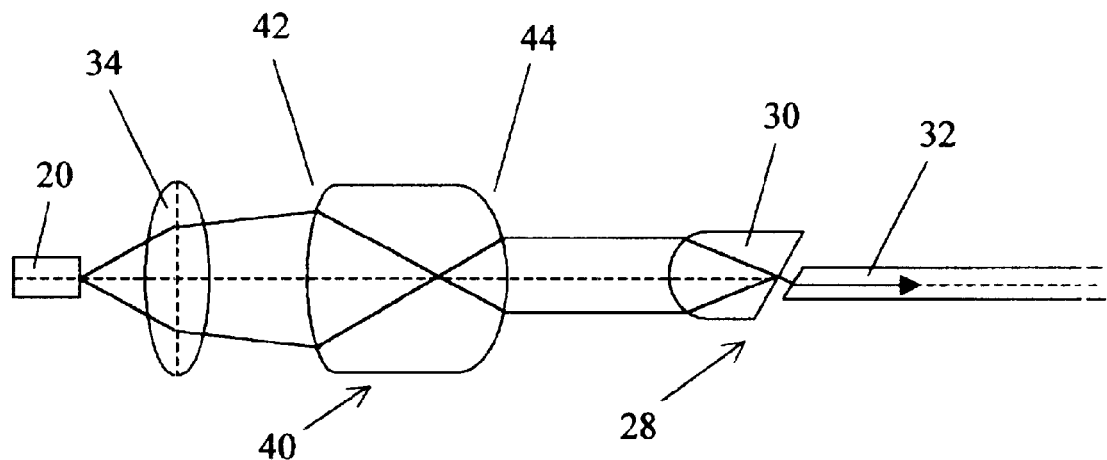
FIG. 4A shows the fiber-coupled laser diode using a cylindrical lens having two positive surfaces in accordance with the invention in the fast-axis plane.
Figure 4B:
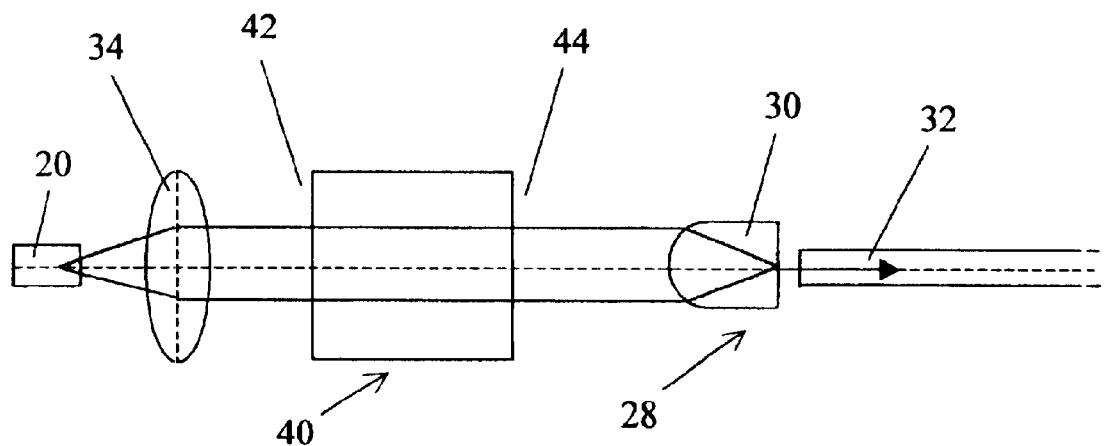
FIG. 4B shows the fiber-coupled laser diode using a cylindrical lens having two positive surfaces in accordance with the invention in the slow-axis plane.

FIGS. 4A and 4B—Description and Operation

FIGS. 4A and 4B show a preferred embodiment of a fiber-coupled laser diode using a cylindrical lens in accordance with the invention. The thickness of the cylindrical lens is comparable to or larger than the dimension of its cross-section. A cylindrical lens 40 functions like the combination of cylindrical lenses 36 and 38. Thus, cylindrical lens 40 can replace cylindrical lenses 36 and 38. FIG. 4A shows light propagation in the fast-axis plane. A first cylindrical positive (convex) surface 42 acts like first cylindrical lens 36, and a second cylindrical positive (convex) surface 44 acts like second cylindrical lens 38. Both cylindrical positive surfaces 42 and 44 are aspheric, preferably simple cylindrical hyperbolic surfaces. Alternatively, surfaces 42 and 44 can be cylindrical-spherical (circular) surfaces with additional cylindrical-spherical (circular) lens elements such as achromatic cylindrical lenses described previously.

A cylindrical lens having a negative (concave) surface and a positive (convex) surface (in contrast to both positive surfaces) is disclosed as a microlens and a minllens in J. J. Snyder, "Cylindrical micro-optics," Proceedings of SPIE, Vol. 1992, 235–246 (1993); U.S. Pat. Nos. 5,181,224 (1993) and 5,553,174 (1996) both to Snyder. The main advantage of a cylindrical lens with negative and positive surfaces is that the thickness of the lens is shorter than that of a cylindrical lens with two positive surfaces. However, in practice the cylindrical negative surface cannot be made aspheric in an ordinary lens grinding process. The negative surface is a simple cylindrical-spherical (circular) surface. Thus, new spherical aberration will be introduced by this surface.

To minimize the spherical aberration introduced by the negative surface, the positive surface includes higher order coefficients in the sag equation (lens surface equation), which makes the design and the grinding process become complex and difficult. Consequently, the cost will be expensive. Any residual aberration will reduce the coupling efficiency between the laser diode and a single-mode fiber.

In contrast, in the fiber-coupled laser diode of FIGS. 4A and 4B, the cylindrical lens has both positive hyperbolic surfaces without higher order coefficients in the sag equation, or achromatic cylindrical surfaces. These surfaces can be easily designed, and also easily fabricated in an ordinary lens grinding process. Since both surfaces are aspheric or achromatic, no or negligible spherical aberration is introduced and consequently high coupling-efficiency between the laser diode and a single-mode fiber can be obtained.

The use of two positive surfaces as shown in FIGS. 4A and 4B produces a flipped beam The beam is flipped 180° in the fast axis but is not flipped in the slow axis. However, since the beam has a circular Gaussian distribution, the flipped beam is identical to the un-flipped beam. Prior-art apparatus (J. J. Snyder, "Cylindrical incro-optics," Proceedings of SPIE, Vol. 1992, 235–246 (1993); U.S. Pat. Nos. 5,181,224 (1993) and 5,553,174 (1996) both to Snyder) do not flip the beam Consequently, they must use a negative surface that is difficult to produce.

The combination of a collimating lens and a pair of cylindrical lenses or surfaces essentially forms an optical apparatus that has different optical powers in fast and slow axes. U.S. Pat. Nos. 4,915,484 (1988) to Yamamoto and 6,075,650 (2000) to Morris et al. disclose a special lens having two different toric surfaces. The toric surface has different optical powers in the fast and slow axes. An example of toric surface is a surface that the radius in x-axis (Rx) differs from the radius in y-axis (Ry). A toric lens cannot be made using an ordinary grinding process. In contrast, the fiber-coupled laser diode of the invention uses a collimating lens and a pair of cylindrical lenses or a cylindrical lens having both positive surfaces, which are easy to fabricate in a conventional process.

The apparatus of the invention shown in FIGS. 3 and 4 can also be used without fiber collimator 28. The apparatus without fiber collimator 28 can produce an astigmatic-aberration-free, circular collimated-laser-diode-beam, which can be used in optical disk systems, laser printers, bar scanners, free space optical communications, laser radars, and other applications that require a collimated laser beam.

Conclusion, Ramifications, and Scope

Accordingly, the reader will see that I have provided a fiber-coupled laser diode, which has both high coupling-efficiency and low feedback-noise. Prior-art fiber-coupled laser diodes have either high coupling-efficiency or low feedback-noise, but they cannot have both The apparatus of the invention shown in FIGS. 3 and 4 provides a flexible coherent light source, which can be easily installed in any optical systems, such as biomedical equipment, spectrometers, laser printers, bar scanners, transmitters for free space and fiber optical communications, laser radars, etc.

The apparatus of FIGS. 3 and 4 can also be used without fiber collimator 28, which produce an astigmatic-aberration-free, circular collimated-laser-diode-beam. The apparatus without fiber collimator 28 can be used in optical disk systems, laser printers, bar scanners, free space optical communications, laser radars, and other applications that require a collimated laser beam The apparatus can also replace conventional lasers such as HeNe laser, Argon laser, etc.

Furthermore, the fiber-coupled laser diode of the invention has additional advantages: it uses optical parts that can be purchased off-the-self or custom-made in an ordinary fabrication; it can be inexpensively produced in volume; it has relaxed misalignment tolerance in coupling the collimated beam from the laser diode to the fiber collimator.

Although the description above contains many specificities, these should not be construed as limiting the scope of the invention but merely providing illustration of some presently preferred embodiments and applications of this invention. For example, collimating lens 34 can perfectly collimate the fast-axis light instead of the slow-axis light. The following pair of cylindrical lenses 36 and 38 or cylindrical lens 40 collimate the slow-axis light and enlarge the beam-waist of the slow-axis light so that it substantially equals to the bean-waist of the fast-axis example is that laser diode 20 can be replaced by a light emitting diode (LED). Thus the scope of the invention should be determined by the appended claims and their legal equivalents, rather than by examples given.

I claim:

1. An apparatus for coupling a laser diode to a single-mode fiber comprising:
   (a) a laser diode for emitting astigmatic and elliptical light, where the long axis of the ellipse is the fist axis, the short axis of the ellipse is the slow axis, and said fist and slow axes are perpendicular;
   (b) a collimating lens for collimating said light emitted from said laser diode in one of said axes;
   (c) a first cylindrical lens for focusing said light emitted from said laser diode in the other one of said axes after passing through said collimating lens, where said focused light diverges after being focused;
   (d) a second cylindrical lens for collimating said diverging light after being focused by said first cylindrical lens, where the beam-waist of said light collimated by said second cylindrical lens in said other one of said axes is substantially equal to the beam-waist of said light collimated by said collimating lens in said one of said axes; and
   (e) a low-feedback-noise fiber collimator for receiving said light collimated by said second cylindrical lens, where the beam-waist of said low-feedback-noise fiber collimator is substantially equal to the beam-waist of said light collimated by said collimating lens in said one of said axes;
   whereby said laser diode will be coupled to the single-mode fiber of said fiber collimator with high coupling-efficiency and low feedback-noise.

2. The apparatus of claim 1 wherein said low-feedback-noise fiber collimator comprises a C-lens and an angled fiber.

3. The apparatus of claims 2 wherein said angled fiber is a single-mode fiber.

4. The apparatus of claim 1 wherein said low-feedback-noise fiber collimator comprises a GRIN lens and an angled fiber.

5. The apparatus of claims 4 wherein said angled fiber is a single-mode fiber.

6. The apparatus of claim 1 wherein said low-feedback-noise fiber collimator comprises a lens and a single-mode fiber that are fused together.

7. An apparatus for coupling a laser diode to a single-mode fiber comprising:
   (a) a laser diode for emitting astigmatic and elliptical light, where the long axis of the ellipse is the fast axis, the short axis of the ellipse is the slow axis, and said fast and slow axes are perpendicular;
   (b) a collimating lens for collimating said light emitted from said laser diode in one of said axes;
   (c) a cylindrical lens having:
      a first positive surface for focusing said light emitted from said laser diode in the other one of said axes after passing through said collimating lens, where said focused light diverges after being focused, and
      a second positive surface for collimating said diverging light after being focused by said first positive surface, where the beam-waist of said light collimated by said second positive surface in said other one of said axes is substantially equal to the beam-waist of said light collimated by said collimating lens in said one of said axes; and
   (d) a low-feedback-noise fiber collimator for receiving said light collimated by said second surface of said cylindrical lens, where the beam-waist of said low-feedback-noise fiber collimator is substantially equal to the beam-waist of said light collimated by said collimating lens in said one of said axes;
   whereby said laser diode will be coupled to the single-mode fiber of said fiber collimator with high coupling-efficiency and low feedback-noise.

8. The apparatus of claim 7 wherein said low-feedback-noise fiber collimator comprises a C-lens and an angled fiber.

9. The apparatus of claims 8 wherein said angled fiber is a single-mode fiber.

10. The apparatus of claim 7 wherein said low-feedback-noise fiber collimator comprises a GRIN lens and an angled fiber.

11. The apparatus of claims 10 wherein said angled fiber is a single-mode fiber.

12. The apparatus of claim 7 wherein said low-feedback-noise fiber collimator comprises a lens and a single-mode fiber that are fused together.

13. An apparatus for producing astigmatic-aberration-free, circular collimated-laser-diode-beam comprising:
   (a) a laser diode for emitting astigmatic and elliptical light, where the long axis of the ellipse is the fist axis, the short axis of the ellipse is the slow axis, and said fast and slow axes are perpendicular;
   (b) a collimating lens for collating said light emitted from said laser diode in one of said axes;
   (c) a first cylindrical lens for focusing said light emitted from said laser diode in the other one of said axes after passing through said collimating lens, where said focused light diverges after being focused; and
   (d) a second cylindrical lens for collimating said diverging light after being focused by said first cylindrical lens, where the beam-waist of said light collimated by said second cylindrical lens in said other one of said axes is substantially equal to the bean-waist of said light collimated by said collimating lens in said one of said axes;
   whereby said second cylindrical lens will output astigmatic-aberration-free, circular collimated-laser-diode-beam.

14. An apparatus for producing astigmatic-aberration-free, circular collimated-laser-diode-beam comprising:
   (a) a laser diode for emitting astigmatic and elliptical light, where the long axis of the ellipse is the fast axis, the short axis of the ellipse is the slow axis, and said fast and slow axes are perpendicular;
   (b) a collimating lens for collimating said light emitted from said laser diode in one of said axes; and
   (c) a cylindrical lens having:
      a first positive surface for focusing said light emitted from said laser diode in the other one of said axes after passing through said collimating lens, where said focused light diverges after being focused, and
      a second positive surface for collimating said diverging light after being focused by said first positive surface, where the beam-waist of said light collimated by said second positive surface m said other one of said axes is substantially equal to the beam-waist of said light collimated by said collimating lens in said one of said axes;
   whereby said cylindrical lens will output astigmatic-aberration-free, circular collimated-laser-diode-beam.

* * * * *